March 28, 1939.    J. A. RUMSEY    2,151,940
AUTOMATIC CUT-OFF VALVE
Filed Dec. 15, 1937
FIG. I.
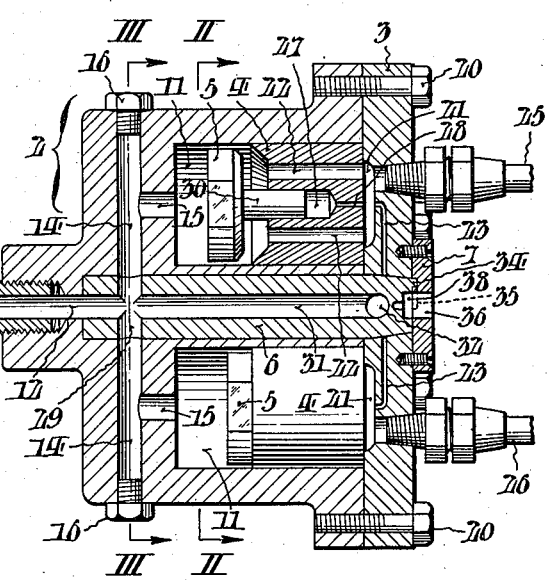
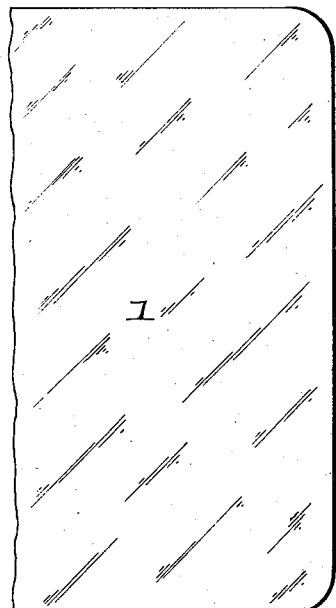
FIG. III.
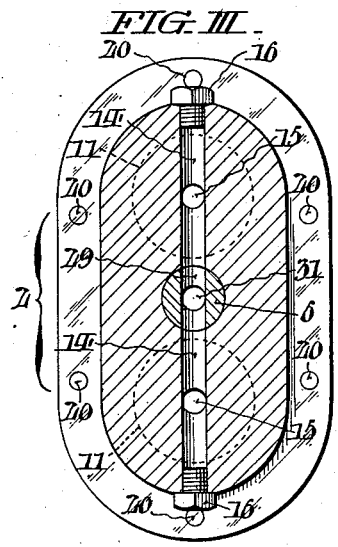
FIG. II.
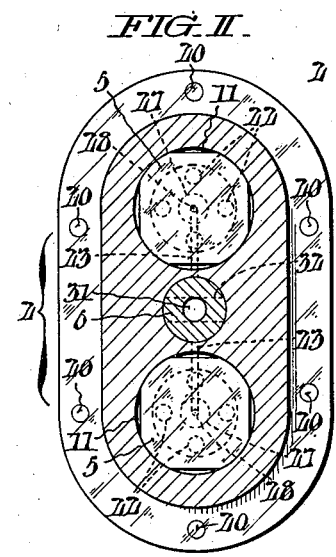
FIG. IV.
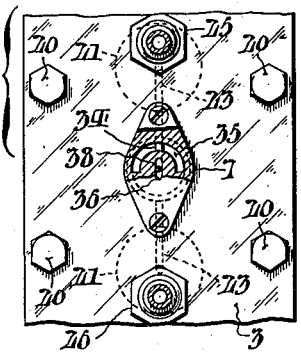
FIG. VI.
FIG. V.
WITNESSES:
Thomas W. Kerr Jr.
Paul P. Davidson
INVENTOR:
John A. Rumsey,
BY Paul & Paul
ATTORNEYS.

Patented Mar. 28, 1939

2,151,940

UNITED STATES PATENT OFFICE 2,151,940

AUTOMATIC CUT-OFF VALVE

John A. Rumsey, Swarthmore, Pa.

Application December 15, 1937, Serial No. 179,808

14 Claims. (Cl. 303—84)

This invention relates to automatic cut-off valves in pressure lines and more specifically to valves of this character which are used in hydraulic brake systems of automobiles.

Automobiles using hydraulic brakes usually have a master cylinder which is operated by the automobile driver. This master cylinder is connected by pressure lines to the operating mechanism of the brakes on the wheels. Pressure on the master cylinder is instantly transmitted to the brake operating mechanisms and in this manner all the brakes are applied uniformly and simultaneously. As is well understood, the whole system is filled with a liquid of some suitable character but air must not be present in the system. Obviously a very slight leak in the system will seriously affect the operation of the brakes; and should any substantial amount of the liquid drain from the system, the entire system will be rendered inoperative. The danger of an automobile whose braking system is rendered inoperative while in motion need not be mentioned. While the hydraulic brake system has many advantages, its one serious shortcoming is the vulnerability of the entire system from a leak or break in any portion of the system.

Accordingly the principal object of my invention is to provide a means for automatically segregating sections of the braking system in case of leaks or breaks and thus localizing the injury. Another object is the provision of a simple device in the system which will automatically close off parts of the system if a serious break or leak occurs in that part but which will not operate as a cut-off valve in cases of small and slow leaks. A further object is to provide a means of this character which has no springs or other resilient parts to get out of adjustment or break under wear. Still further objects are simplicity of structure and operation, efficient and easy readjustment after the automatic cut-off valve has functioned, and positiveness of operation. Other objects and advantages will appear from the following detailed description of a preferred embodiment of my invention, reference being had to the accompanying drawing.

Fig. I of the drawing shows in a vertical longitudinal sectional view an automatic cut-off valve embodying my invention, which is adapted for use in the hydraulic brake systems of automobiles.

Fig. II is a sectional view of the same taken as indicated by the arrows II—II in Fig. I.

Fig. III is a sectional view of the same taken as indicated by the arrows III—III in Fig. I.

Fig. IV is a partial end view of the apparatus of Fig. I, partially in section.

Fig. V is a perspective view of the discharge element on which the valve member seats in closing.

Fig. VI is a perspective view of the valve member.

In describing the preferrred embodiment of my invention illustrated in the drawing, I shall resort to specific terminology for the sake of clarity. However, I do not wish to be limited to the specific terms selected and I intend each specific term to include all technical equivalents which operate in a similar manner to accomplish a similar purpose.

In Fig. I, there is shown a diagrammatic representation of a master cylinder 1 of an automobile hydraulic brake system, connected at its discharge end to an automatic cut-off valve shown in section. This automatic cut-off valve which embodies my invention comprises generally a body 2, a cover member 3, discharge elements 4, valve members 5, adjustment valve 6 and an end plate 7. The body 2 should be rugged in construction and may be made from any suitable metal as will be well understood by the art. It has formed therein two cylindrical cavities 11 which are of a proper diameter to receive the discharge elements 4 with a press-fit. A supply conduit 12 is formed in the body 2 for connecting the master cylinder 1 to the cavities 11 which it does by means of conduit branches 14 and orifices 15. The branches 14 may be vented to the atmosphere for bleeding purposes by removing taps 16 provided for that purpose. A tubular opening is formed axially in the body 2 to receive the adjustment valve 6 snugly but with capacity for controlled rotation. When the valve 6 has been moved to a position, it must remain there until moved again for adjustment purposes.

The cover member 3 is bolted to the body 2 by means of bolts 20. In the cover member 3 are formed cavities 21 to receive the discharge from the discharge orifices 22 formed in the discharge elements 4. Ducts 23 are also formed in the cover member 3 for connecting cavities 21 to the pressure source as will be explained later, the ducts 23 being separated by the cavity formed to receive the end of the adjustment valve 6. The cavities 21 are provided with discharge openings communicating to the two separate parts of the hydraulic brake system through pressure lines 25 and 26. The pressure lines 25 and 26 are attached to the cover member 3 in a manner well understood in the art. Line 25 leads to the front brakes; line 26 to the rear brakes.

The discharge elements 4 are cylindrical in shape and are positioned in the cylindrical cavities 11 with their outer ends flush with the cover member 3. The inner ends of these discharge elements 4 are beveled to provide seats for the valves 5. The length of the discharge element 4 is shorter than the cylindrical cavity 11 which provides space for the free floating of the valve 5. Each discharge element 4 has a group of four discharge orifices 22 positioned around a relatively large centrally placed dash pot 27. The discharge orifices 22 are of uniform diameter and extend completely through the discharge element 4. The dash pot 27 does not extend completely through the discharge element 4, but terminates in a relatively small restricted orifice or nozzle 28 which does extend through the discharge element 4, and connects the dash pot 27 with the cavity 21 in the cover member 3.

The valves 5 are square with arcuate corners which are formed on the same diameter as the cylindrical cavities 11. The square portions provide relatively restricted opening between the valve periphery and the surrounding cylinder walls which permits a small flow of liquid past the valve when open without urging it to close. The underside of each valve 5 is beveled to cooperate with the valve seats formed in the discharge elements 4. A plunger 30 is also formed on the underside of each valve member 5, the plunger 30 being formed to fit into the dash pot 27. The valve member 5 should move easily in the cylindrical cavity 11 in order to function as a floating valve. The relation between the length of the cylindrical cavity 11, the plunger 30 and the discharge element 4 should be such that when the valve 5 is in its extreme open position the plunger 30 will not be completely out of the dash pot 27.

The adjustment valve 6 has formed therein an axial conduit 31 which is in registry with the supply conduit 12. This conduit 31 terminates at the cover end of the cut-out valve in a radially formed orifice 32 extending completely through the valve 6 and so positioned that when the valve 6 is turned to a certain place the orifice 32 will connect the two ducts 23 to the source of pressure. At the other end of the valve 6 from the orifice 32 is another similarly formed orifice 29 at right angles to the orifice 32, and also extending all the way through the valve 6. The valve 6 is tapered at the end towards the cover member 3 and a corresponding cavity is formed in the cover member 3 to receive this tapering end of the valve 6. The valve 6 extends through the cover member 3 and has a lug 34 on the end thereof which moves in the arcuate slot 35 formed in end plate 7 which is screwed in place on cover member 3. Thus the valve 6 by means of the lug 34 and slot 35 is limited in rotary movement. The valve 6 is turned by means of a key (not shown) which fits through an opening 36 in end plate 7 and into a similarly shaped groove 38 formed in the end of valve 6. When the end portion of the key is received in the groove 38 and the valve 6 turned either to the right or left, the key cannot be removed until the valve 6 is returned to its initial position with the groove 38 in registry with the opening 36. In the initial position the valve 6 places the cut-off valve in condition for normal operation and a mechanic cannot physically remove the key after adjusting the cut-off valve until the cut-off valve is placed in condition for normal operation. By turning the valve 6 to its extreme position in either direction the master cylinder is cut off from the conduit branches 14 but is continued open to the conduit 31 which communicates with ducts 23 through orifice 32. It has been found desirable in practice to mount my automatic cut-off valve in a position in which the valves 5 are gravity influenced toward the open position away from the elements 4. This counteracts any tendency of the valves 5 to close under vibration. When the valve 5 is of a comparatively light metal, I recommend that the plunger 30 be upright with the valve 5 urged open by gravity.

A description of the operation of the above described cut-off valve will further clarify the above structural description. In describing the operation, resort will be had to the terms "upper" and "lower" to designate the parts of the cut-off valve associated functionally with the front and rear brake systems respectively. For example, the "upper" valve 5 designates the valve 5 which controls the front brake system through pressure line 25 and it is the uppermost valve 5 in Fig. I. The upper valve 5 is shown in the normally operating position with the pressure line 25 in proper condition. The lower valve 5 is shown in the closed position after a break has occurred in pressure line 26.

Before the break occurred in pressure line 26, the lower valve 5 floated freely in a position similar to that of upper valve 5. When the break occurred, the pressure was relieved in the pressure line 26 and the surge of fluid through the lower cylindrical cavity 11 carried the lower valve 5 to the closed position as is shown in Fig. I. This immediately segregated the rear brake system from the master cylinder 1 and the rest of the brake system. Hence the front brakes continued to operate and very little fluid and pressure was lost from the front part of the system.

The next consideration is the repair of the break in the rear part of the system. When this is accomplished, we then proceed to adjusting the cut-off valve to its operative position again. This is done by removing the lower tap 16 to open the vent and then rotating the adjustment valve 6 by means of a key until the pressure supply is connected to the lower dash pot 27 through the lower conduit 23, the lower cavity 21 and the lower nozzle 28. The pressure on the lower plunger 30 quickly moves the lower valve 5 to the full open position for it is opposed by atmospheric pressure only. The lower tap 16 is then replaced, the adjustment valve returned to its initial position and the key removed. The cut-off valve is now ready for future operation.

Thus my invention provides a simple and efficient cut-off valve for installation in a pressure system such as a hydraulic brake system for automobiles. By means of my cut-off valve the system may be segregated into two or more parts and in that manner the part in which a break occurs becomes automatically segregated from the rest of the system and remains so until the break has been repaired and the valve re-adjusted for normal operation. The cut-off valve of my invention is simple in structure and avoids parts which wear quickly or get out of adjustment, such as springs and other resilient parts. A further very desirable characteristic of my invention is that the cut-off valve does not operate for minor leaks which have only a gradually cumulative effect on the operation of the system. Leaks of this character are not so serious because their presence is manifested before they have any serious effect on the system but when a serious break occurs in a system equipped with the cut-off valve of my invention that portion of the system is positively and completely shut off before the remainder of the system is adversely affected. The importance of this in the case of automobiles is obvious.

While I have described a specific embodiment of my invention in considerable detail, it will be obvious to one skilled in the art that many variations may be made in the specific embodiment described above without departing from the spirit of my invention as hereinafter claimed.

Having thus described my invention, I claim:

1. In an automatic cut-off valve for a pressure line, a cylinder, a valve operating in said cylinder, a normally ineffective valve seat in said cylinder to receive said valve in closing, and means for opposing the closure of said valve consisting of a plunger attached to said valve, and a dash pot receiving said plunger, said dash pot having a restricted orifice opening from its bottom end.

2. An automatic cut-off valve for a pressure line comprising a body, a normally ineffective valve operating in a cylindrical space in said body, a seat to receive said valve in closing, and means for opposing the closure of said valve consisting of a plunger attached to said valve, and a dash pot receiving said plunger, said dash pot having a restricted conduit leading from its bottom portion into the discharge side of said valve.

3. An automatic cut-off valve comprising a body, a floating valve operating in a cylinder formed in said body, a plunger attached to said valve, a dash pot receiving said plunger, said dash pot having a restricted nozzle connecting to the discharge side of said valve and an adjustment valve for admitting pressure to said dash pot through said nozzle from the supply side of said valve.

4. An automatic cut-off valve, comprising a cylinder, a floating valve operating in said cylinder, said valve being cut away at portions of its periphery, a plunger mounted on the discharge side of the valve, a dash pot receiving said plunger, a restricted orifice connecting the bottom portion of said dash pot with the discharge side of said valve, an adjustment valve for closing off the supply side of said valve and admitting pressure to the dash pot.

5. The invention of claim 4 wherein a vent to atmosphere is provided for said supply side of said valve and a closure member is provided for said vent.

6. The invention of claim 4 wherein a key is provided for turning said adjustment valve, said key being incapable of removal until said valve is returned to its normal position.

7. The invention of claim 4 wherein said adjustment valve is provided with means for restricting its turning capacity.

8. An automatic cut-off valve comprising a cylinder, a discharge element positioned in said cylinder, a floating valve positioned on the supply side of said discharge element, a seat formed on said discharge element to receive said valve, a discharge orifice extending through said discharge element, a dash pot formed in said discharge element, a plunger attached to said valve and received by said dash pot, and a restricted orifice extending said dash pot through said discharge element.

9. The invention of claim 8 wherein an adjustment valve is provided for cutting off the supply side of said valve from the pressure source and connecting the pressure source to said dash pot.

10. An automatic cut-off valve comprising a body, a cylinder formed in said body, a floating valve operating in said cylinder, a discharge element rigidly secured in said cylinder, said discharge element having a discharge orifice extending therethrough, a plunger mounted on said valve, a dash pot formed in said discharge element, said plunger extending into said dash pot, a cavity formed in said body to receive the discharge from said discharge element, said cavity having a connection for a pressure line, a nozzle connecting said dash pot with said cavity, a supply conduit formed in said body for connecting the said cylinder to a source of pressure, and a conduit by which said source of pressure may be connected to said cavity.

11. The invention of claim 10 wherein an adjustment valve is provided for closing said supply conduit when said pressure source is connected to said cavity and vice-versa.

12. The invention of claim 10 wherein said apparatus is duplicated and a common adjustment valve is provided for said cut-off valve.

13. The invention of claim 10 wherein a vent is provided for said supply conduit and a removable cover is provided for said body affording access to the internal elements of said valve.

14. The invention of claim 1 wherein said automatic valve is mounted in a position which subjects said valve to the force of gravity urging said valve toward the open position.

JOHN A. RUMSEY.